Figure 3:
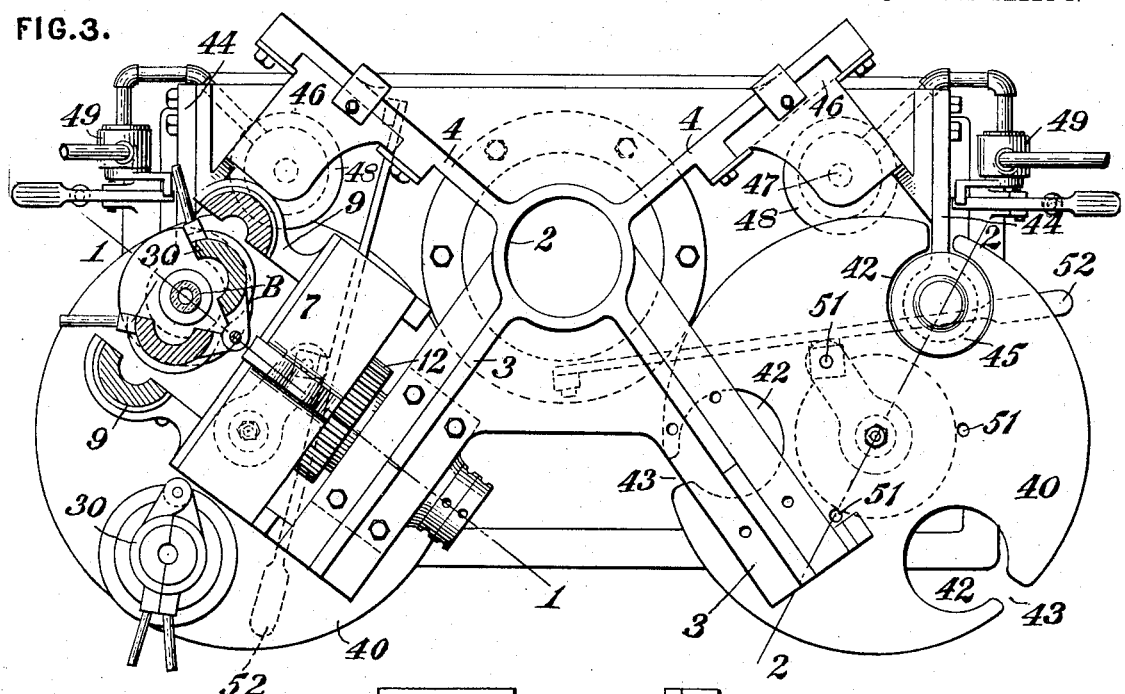

F. O'NEILL.
MACHINE FOR MANUFACTURING GLASSWARE.
APPLICATION FILED AUG. 1, 1910.
994,422.
Patented June 6, 1911.
4 SHEETS—SHEET 1.
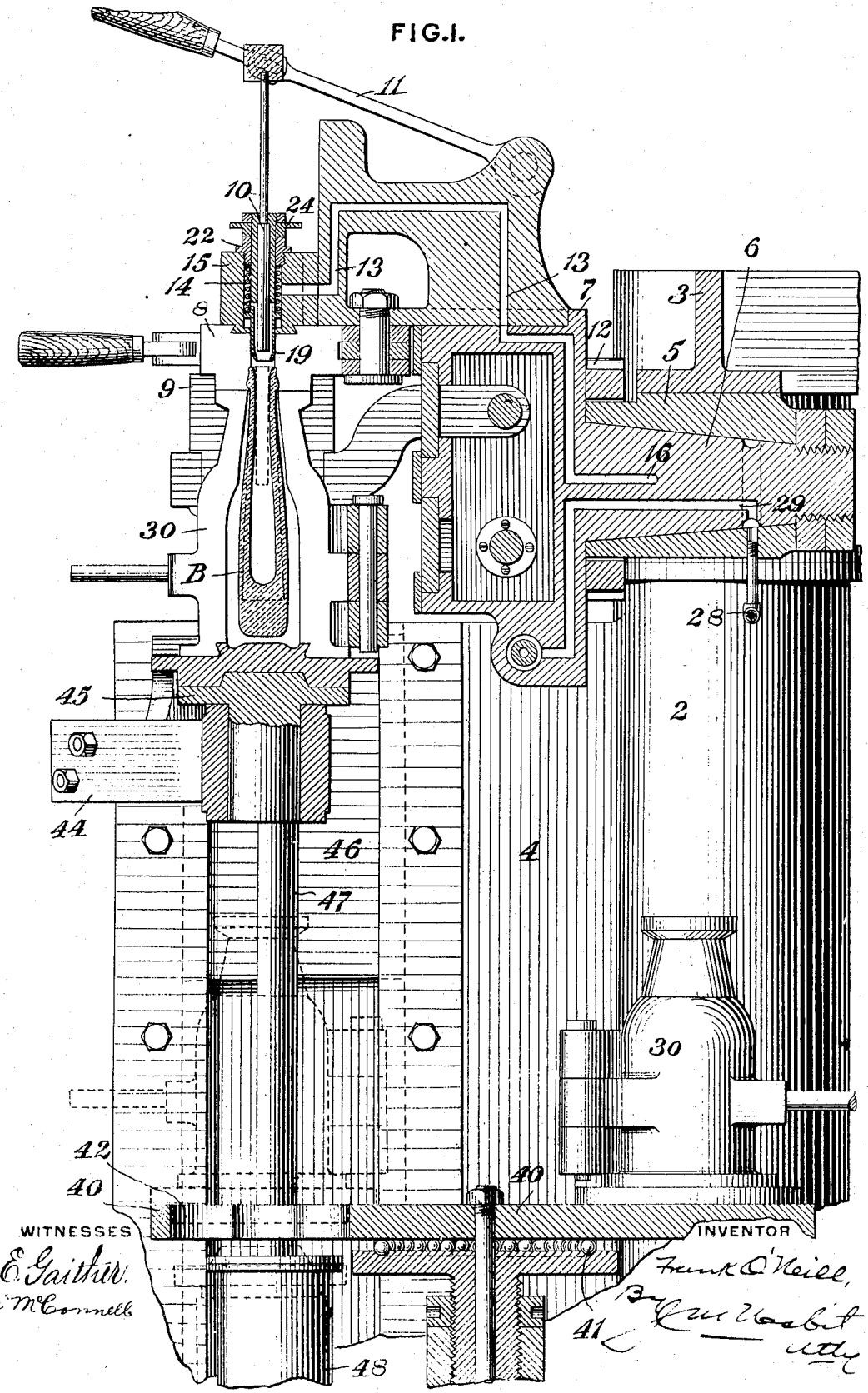

F. O'NEILL.
MACHINE FOR MANUFACTURING GLASSWARE.
APPLICATION FILED AUG. 1, 1910.

994,422.

Patented June 6, 1911.

4 SHEETS—SHEET 2.

WITNESSES
F. E. Gaither
Ella McConnell

INVENTOR
Frank O'Neill
By Jes Nesbit
Atty

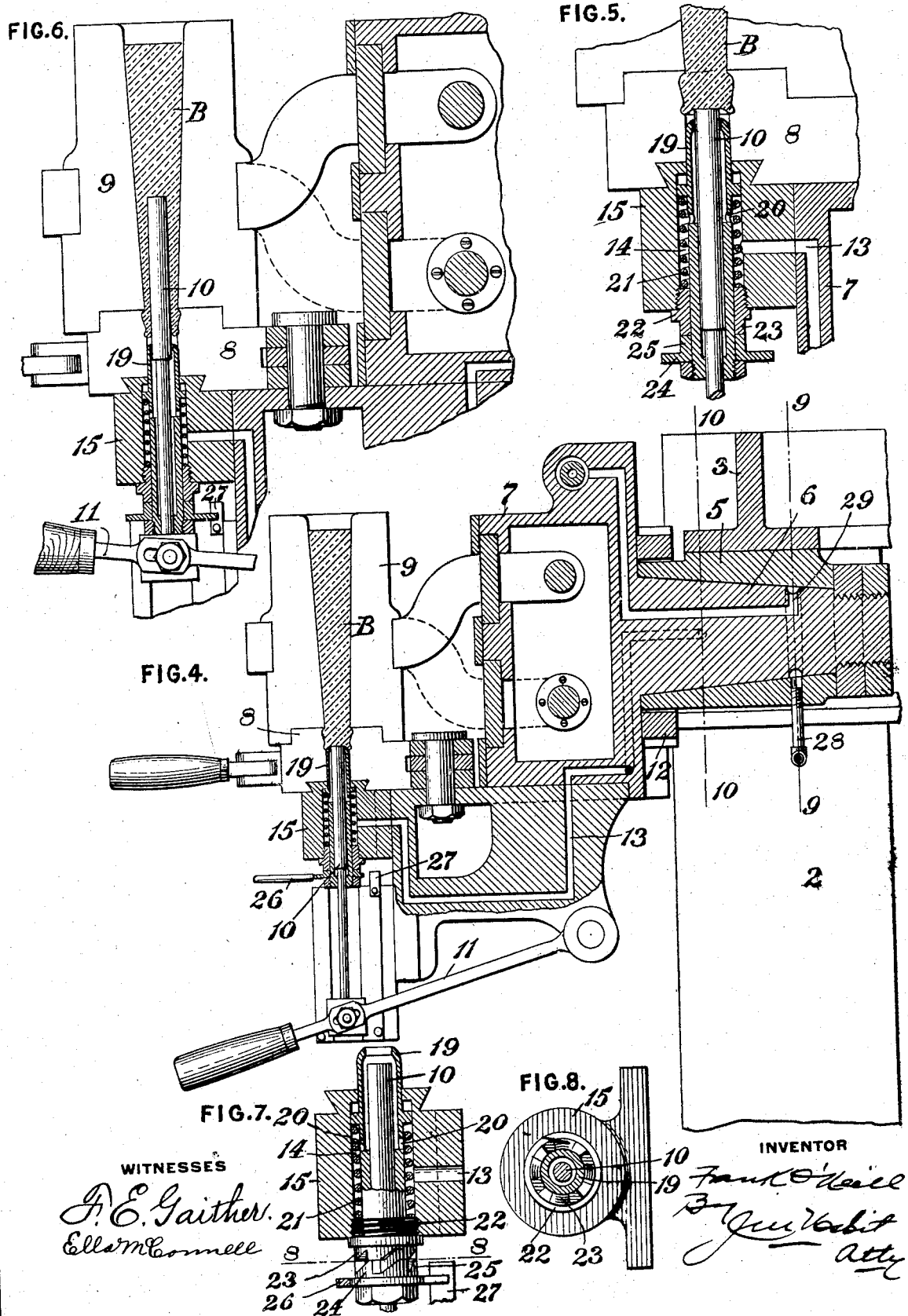

F. O'NEILL.
MACHINE FOR MANUFACTURING GLASSWARE.
APPLICATION FILED AUG. 1, 1910.
994,422.
Patented June 6, 1911.
4 SHEETS—SHEET 4.
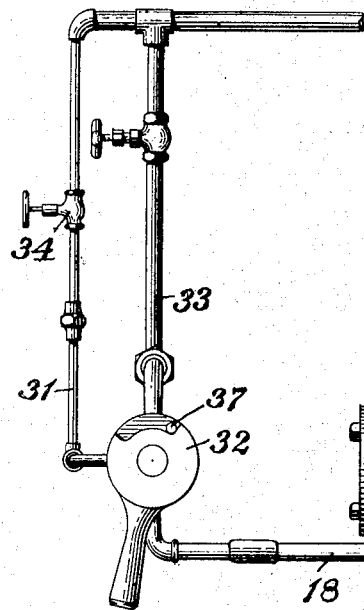
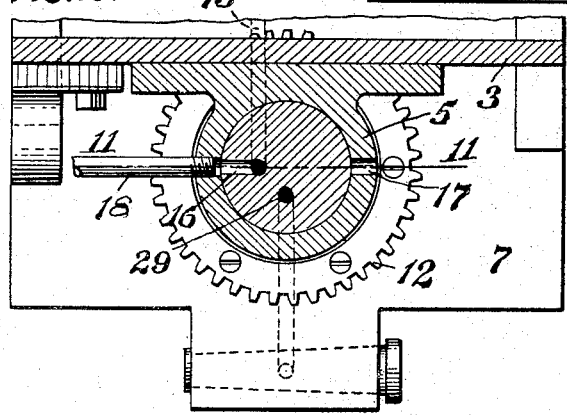
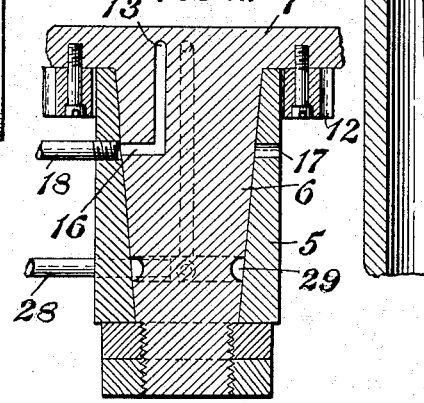
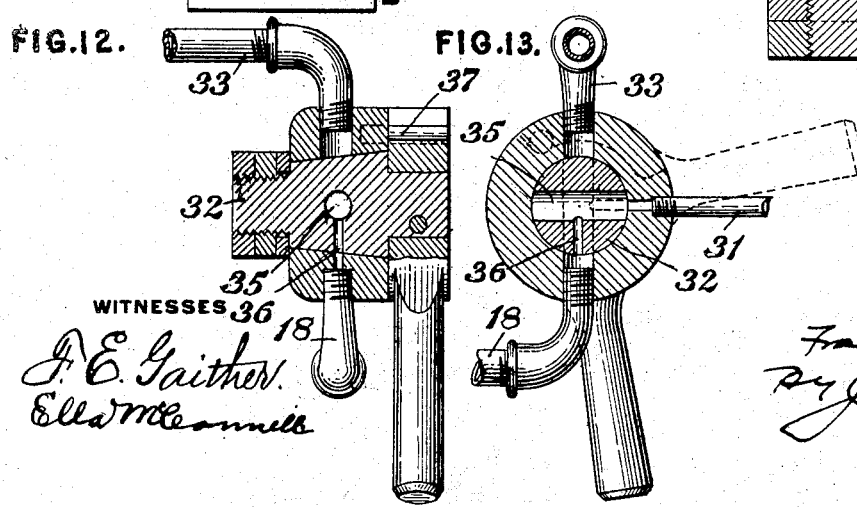
WITNESSES
J. E. Gaither
Ella McConnell
INVENTOR
Frank O'Neill
by Jas Nesbit
Atty.

UNITED STATES PATENT OFFICE.

FRANK O'NEILL, OF ZANESVILLE, OHIO, ASSIGNOR TO O'NEILL BOTTLE MACHINE COMPANY, OF TERRE HAUTE, INDIANA, A CORPORATION OF INDIANA.

MACHINE FOR MANUFACTURING GLASSWARE.

994,422.  Specification of Letters Patent.  Patented June 6, 1911.

Application filed August 1, 1910. Serial No. 574,900.

*To all whom it may concern:*

Be it known that I, FRANK O'NEILL, a resident of Zanesville, in the county of Muskingum and State of Ohio, have invented certain new and useful Improvements in Machines for Manufacturing Glassware, of which the following is a specification.

This invention relates to certain modifications of and improvements on the invention entitled "Manufacture of glass bottles," filed May 27, 1909, Serial No. 498,701.

One purpose of the construction here embodied is to provide new and efficient means for admitting air under pressure to the blank, the arrangement being such that a relatively small amount of air is first admitted to the blank for stretching or elongating it before the full blast is turned on for blowing the blank to bottle form. In this connection a further object is to so arrange the blank-elongating air-connection that the air is admitted as soon as the blank is moved into blowing position, the blank being preferably formed when the parison and neck molds are in another position.

Another object is to provide for placing the neck mold in communication with the atmosphere when the molten glass is entered in the parison mold, the latter at such time being above the neck mold, thus affording an outlet for any air that may have become pocketed in either mold as well as any gases or products that may have remained in any of the mold cavities from the preceding molding operation.

I have also provided improved means for shaping the neck extremity of the blank, said extremity engaging a tubular member when the glass is first placed in the parison and neck molds, with means for retracting said member before entering the plunger into the glass and avoiding chilling the extremity of the blank and permitting the glass to flow in such manner when the plunger is inserted as to form the blank with a rounded edge extremity.

The invention also includes improved means for removably supporting a plurality of blow molds, together with improved mechanism for lifting such molds one by one into operative relation with the neck mold.

Figure 2:
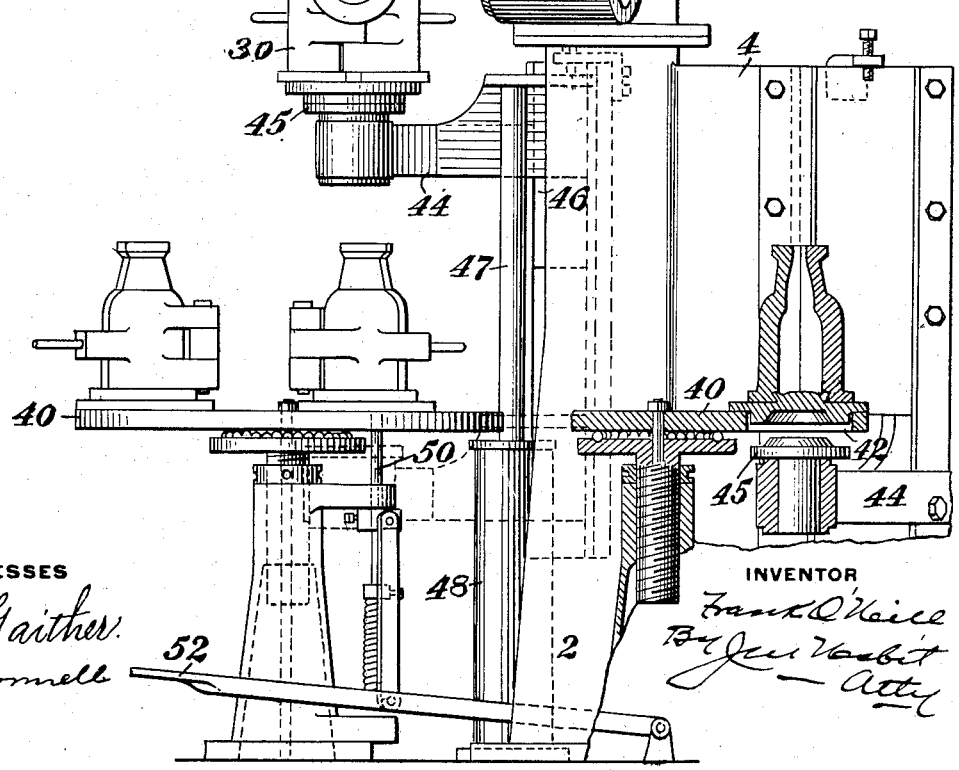

In the accompanying drawings, Figure 1 is a vertical section of a portion of the machine, taken on line 1—1 of Fig. 3, one of the blow molds being shown raised and in operative relation with the neck mold, and with the glass blank elongated within the raised mold as it appears just prior to being blown. Fig. 2 is an elevation of the machine, one of the blow molds being shown raised as in Fig. 1, the mechanism at the right hand side of Fig. 2 being shown in section on line 2—2 of Fig. 3. Fig. 3 is a top plan of the machine, some of the molds being shown in section, the air circulating pipes being omitted. Fig. 4 is a vertical section of the parison and neck molds and their carrier, showing the position of the parts after the glass has been placed therein just prior to shaping the neck of the glass blank. Fig. 5 illustrates a portion of the blank, together with the neck mold, the parts being in the position they assume just prior to entering the plunger in the blank; and Fig. 6 is a similar view, illustrating more of the mechanism, and with the plunger entered in the blank. Fig. 7 is a sectional detail of the tubular member which coöperates with the plunger and forming the extremity of the blank neck; and Fig. 8 is an inverted sectional plan on line 8—8 of Fig. 7. Fig. 9 is a section through the mold carrier journal and its support, taken on line 9—9 of Fig. 4, the air circulating pipes and controlling valves being shown in this view. Fig. 10 is a section through the carrier journal on line 10—10 of Fig. 4. Fig. 11 is a longitudinal section of the carrier journal, taken on line 11—11 of Fig. 10. Figs. 12 and 13 are sectional details of the three-way air controlling valve.

As here embodied, the machine is constructed with two complete sets of forming mechanisms, as shown in Figs. 1 and 2, but the description will be confined to one only, as the mechanisms are duplicates one of the other, and it will be apparent that apparatus may be constructed with only one of the complete mechanisms, or even with more than two.

A considerable part of the present construction is like that shown and described in my above recited application for patent, to which reference may be made for such description as is here omitted.

Referring to the drawings, 2 designates an upright support having two wing-like extensions 3 and 4 arranged at approximately right angles to each other. The extension 3 is formed with a horizontal bearing 5, and mounted in this bearing is the tapered journal or spindle 6 projecting from the rear of a carrier body 7. Mounted on this carrier is the sectional neck mold 8 and the two-part parison mold 9, the latter supported in the manner and operated at the intervals described in the above recited application. Also supported by the carrier so as to operate through the neck mold is the plunger 10 operated by lever 11. And, as in the former application, carrier 7 is provided with a gear wheel 12 which is engaged by a rack (not here shown) for turning carrier 7 and the parts mounted thereon. Hence, when the parts are in the position shown in Figs. 4, 5 and 6, parison mold 9 is closed and is above and in register with the neck mold 8, and it is while in this position that the glass is placed in the parison mold and flows into the neck mold, as shown in Fig. 4.

The carrier 7 is ported to form a duct 13, one end of which communicates with a chamber 14 in an extended part 15 of the carrier, the neck mold registering with this extended part. Duct 13 extends backwardly through carrier 7 and into journal 6 where it opens through the face of the latter at 16, and when the parts are turned to blank-forming position, as in Figs. 4, 5 and 6, duct extension 16 is in register with port 17 in bearing 5 which is open to the atmosphere. There is sufficient clearance between plunger 10 and the tubular member (presently to be described) surrounding the same to permit any air, gas or products to escape from the parison and neck molds that may have become pocketed beneath the charge of glass, and which is thus prevented from forming imperfections in the blank. When carrier 7 is turned from the position of Fig. 4 to that of Fig. 1, duct extension 16 registers with pipe 18 for admitting air to the blank, as will presently appear, at such time port 17 to the atmosphere being blanked.

19 is a tubular member which is operative in cavity 14 of the carrier extension 15, and which projects into the neck mold 8, with its extremity forming a part of the bottom closure of the mold cavity when the glass is entered in the parison and neck molds to form blank B, as shown in Fig. 4. At this time the extremity of plunger 10 is flush with the end of member 19, but there is sufficient clearance between the plunger and said member to permit air to escape thereinto from the molds and from thence through ports 20 to duct 13. The tubular member is held normally projected by spring 21, and is adapted to work through fixed bushing 22 provided with the wedge-like teeth 23, while secured to the extremity of member 19 is head 24 provided with the wedge-like teeth complementary with teeth 23, so that when head 24 is turned by handle 26, the tubular member is retracted as shown in Figs. 5, 6 and 7, fixed stop 27 limiting the movement so that the parts are held in separated position as in Fig. 7 when the handle is fully turned. Before the plunger 10 is thrust into the blank by its lever 11, the tubular member is moved away from the glass, as shown in Fig. 5, so that when the plunger is projected as in Fig. 6, the extreme edge of the blank is neither chilled nor its movement retarded, the glass being free to turn inwardly slightly or follow the plunger and form the blank with a preferably rounded neck extremity.

In my former application, one pipe is shown for supplying air for blowing and also for operating a cylinder mechanism which actuates the parison mold. In the present adaptation, the air for blowing is supplied through pipe 18, and air for operating the mold actuating mechanism is supplied through a separate and distinct pipe 28, the carrier 7 and its spindle 6 being ported at 29 to pass the air for this purpose, the mold actuating mechanism operating as described in my above mentioned application.

After the blank has been formed and carrier 7 turned to move the blank from upright position, as in Fig. 4, to depending position, as in Fig. 1, the parison mold sections separate and are replaced by a blow mold 30. The blank B at such time is shorter than the depth of the blow mold, and it is desirable to elongate it by relatively low air pressure before finally blowing it. The low pressure air, together with the tendency of the blank to elongate by gravity, operate to change the blank from the shape shown in full lines in Fig. 6 and in dotted lines in Fig. 1 to that illustrated by full lines in Fig. 1, when the blank reaches nearly to the bottom of the blow mold. To admit air for this elongation, a pipe 31 is in communication with pipe 18 through a three-way valve 32, so that as soon as carrier 7 and its spindle 6 have been turned to place the blank in suspended position, as from that shown in Fig. 4 to that of Fig. 1, duct extension 16 registers with pipe 18, and a limited amount of air is admitted into the blank cavity, thereby at once and automatically starting the elongation of the blank. As soon as the blank has been sufficiently stretched the operator closes the blow mold (said mold having been open when raised to blowing position), and the three-way valve is turned to admit the full air pressure from a second pipe 33 for blowing the blank into a completed bottle.

A needle or like graduating valve 34 is placed in pipe 31 so that a minute adjustment may be made for obtaining the exact volume of air requisite for elongating the blank. The normal position of the threeway valve 32 is as shown in Figs. 9, 12 and 13, the larger port 35 being then out of register with pipes 18 and 33, but in conjunction with relatively small port 36 establishing communication between pipes 18 and 31. As soon as the blank has been elongated, as above described, and is ready for blowing, valve 32 is turned to the position indicated in dotted lines in Fig. 13, thereby establishing full communication between pipes 18 and 35 and admitting the full blast of air. The extreme position of valve 32 may be determined by a stop pin 37 which is engaged by shoulders on the valve, as shown in Fig. 9.

Instead of using a single blow mold as contemplated in the adaptation shown in my above recited application, I have here arranged for the use of a plurality of blow molds, so that the operation of the machine need not be delayed when removing a blown bottle; also by using several molds they are prevented from becoming too highly heated. In the arrangement here proposed, table 40 is mounted to revolve on a vertical axis, being preferably provided with a ball bearing 41, and is provided with three mold positions so that by turning the table one after the other of the blow molds 30 may be placed into vertical line with the neck mold.

The blow molds are loosely seated on table 40 in or above openings 42, the latter being open through the edge of the table, as indicated at 43. Operating through opening 43 is arm 44 provided with a lifting head 45 which is normally beneath table 40, but which is raised when the mold is to be lifted, the raised portion of the head entering a cavity in the mold bottom, as illustrated in Fig. 1, and at the righthand side of Fig. 2, thus centering the mold on the lifting device and moving it into accurate register with the neck mold. The lifting arm 44 is carried by a slide 46. Piston 47 is connected to this arm and extends from cylinder 48 at the base of the machine, air for operating the piston being controlled by a treadle-actuated valve 49. Table 40 may be turned by hand, and the spring-actuated locking rod 50 engages holes 51 in table 40 for holding it with one or another of the molds in operative position. The locking rod may be conveniently released by a foot lever 52.

I claim:

1. The combination of a horizontally movable table, a plurality of blow molds removably seated on the table, a vertically movable blow mold lifter past which the table moves and to which the table presents the blow molds one by one to be lifted, blank holding means to which the lifter presents each blow mold, and blowing means.

2. The combination of a horizontally movable table having a series of vertical openings which form mold seats, a plurality of blow molds—one for each opening, a vertically movable mold lifter normally lowered beneath the table with the latter movable thereover, means for holding the table fixed with one or another of the blow molds centered above the lifter, lifter operating means, blank holding means to which the lifter raises each blow mold, and blowing means.

3. The combination of a blow mold, means for forming a glass bottle blank shorter than the blow mold, two air supplying means—one admitting a relatively small amount of air to the blank for elongating the same, and the other air supply operating to admit a relatively large amount of air thereto for blowing the blank within the blow mold and a single valve controlling the two air supply means.

4. The combination of a blow mold, bottle blank forming means movable from one position to another, means operative when the forming mechanism is in one position to form a blank shorter than the blow mold, means operating automatically when the forming mechanism together with said blank is moved to another position to admit a relatively small amount of air into the blank for elongating it, and means for admitting a relatively large amount of air to the elongated blank for blowing it in the blow mold.

5. The combination of a neck mold movable from one position to another, means for forming the neck of a glass blank in the neck mold while the latter is in one position and thereby securing the blank in said mold, means operating automatically only after the neck mold is moved to another position to admit a restricted amount of air into the blank for elongating the same, a blow mold, and means for admitting a relatively large amount of air into the elongated blank for blowing the same.

6. The combination of a revoluble carrier, a parison mold and a neck mold on the carrier, the carrier having a recessed part registering with the neck mold and the carrier ported for passing air to said recessed part, a fixed member having an air admitting port which registers with the port of the carrier when the latter is turned to place the neck mold above the parison mold, a plunger for shaping the blank in the neck mold when the latter is beneath the parison mold, a blow mold, and two air ducts in communication with the port of said fixed member, one duct being normally open for the passage of a restricted amount of air, and a valve controlling the passage of a relatively large amount of air through the other duct.

7. In a bottle machine, a carrier, means for inverting the carrier, parison and neck molds on the carrier—one above the other, a plunger for shaping the neck of the blank and for forming a cavity therein while the parison mold is above the neck mold, means for opening the parison mold when the carrier is turned to place the neck mold in uppermost position, a blow mold and means for placing the same in operative relation with the neck mold, means operating automatically to admit a relatively small amount of air into the blank cavity for elongating the blank when the parison mold is beneath the neck mold, and means for admitting a relatively large volume of air into the blank after it has been elongated for blowing it in the blow mold.

8. The combination of coöperating neck and parison molds, a plunger operative through the neck mold and into the parison mold, a tubular member through which the plunger operates, the extremity of the glass blank forming against said member, and means for retracting said member before entering the plunger in the glass.

9. The combination of coöperating neck and parison molds, a plunger operative through the neck mold and into the parison mold, a tubular member through which the plunger operates, a spring holding the said member projected to be engaged by the extremity of the blank when the glass enters the neck mold, and fixed and movable cam surfaces operative one on the other to retract the spring held tubular member before entering the plunger in the glass.

10. The combination of a movable carrier, coöperating parison and neck molds on the carrier with the parison mold above the neck mold when forming a blank, plunger means operative through the neck mold, the carrier having an air duct open to the neck mold and to the atmosphere when the molds are in blank-forming position, means for moving the carrier and placing the molds in another position and at the same time closing communication between the neck mold and the atmosphere and opening communication between said mold and a compressed air supply, and a blow mold adapted to coöperate with the neck mold.

11. The combination of a movable carrier, a sectional parison mold and a neck mold on the carrier, plunger mechanism, the carrier provided with a projecting journal, a bearing in which the journal rotates, the journal and the carrier formed with a duct in communication with the neck mold and also formed with other ducts for passing air to operate the parison mold, two air supply pipes extending to ports in the spindle bearing said ports adapted to register with the air ducts formed in the journal, and a blow mold.

12. The combination of a blow mold, a neck mold, means for forming the neck end of a blank in the neck mold with the blank shorter than the blow mold, a duct for passing air to the neck mold, two air supply pipes for said duct, and a three-way valve connecting said pipes and air duct and controlling communication therebetween, means for limiting the amount of air passing through the valve from one of the pipes with said pipe adapted to communicate with the air duct through said valve when the other air pipe is closed by the valve.

13. The combination of a blow mold, a neck mold, means for forming the neck end of a blank in the neck mold with the blank shorter than the blow mold, a duct for passing air to the neck mold, two air supply pipes for said duct, and a threeway valve connecting said pipes and air duct and controlling communication therebetween, said valve having a relatively small port for establishing communication between one of the pipes and the air duct and also formed with a relatively large port for establishing communication between the other pipe and the duct.

14. The combination of a carrier rotatable on a horizontal axis, coöperating parison and neck molds on the carrier with the relative positions of said molds adapted to be reversed on the carrier when the latter is rotated, the parison mold adapted to open when it is beneath the neck mold, a horizontally movable table, a plurality of blow molds removably seated on the table, and means for lifting the blow molds one by one from the table and placing the same in operative relation to the neck mold.

15. The combination of a carrier rotatable on a horizontal axis, coöperating parison and neck molds on the carrier with the relative positions of said molds adapted to be reversed when the carrier is rotated, the parison mold adapted to be moved out of operative relation with the neck mold after the carrier has been turned to place it beneath the neck mold, a horizontally movable table having openings therein which form mold seats, a plurality of blow molds seated in said openings, and a vertically movable mold lifting device beneath the table and operative through the openings thereof to lift the blow molds one by one into operative relation with the neck mold.

16. The combination of a neck mold, blank-forming mechanism adapted to secure the neck end of a tubular blank in the neck mold with the blank suspended therefrom, a horizontally movable table having vertical openings therethrough, a plurality of blow molds removably seated on the table, and mechanism beneath the table and operating through the openings thereof to raise the blow molds one by one into operative relation with the neck mold.

17. The combination of a neck mold, blank-forming mechanism adapted to secure the neck end of a tubular blank in the neck mold with the blank suspended therefrom, a table rotatable on a vertical axis and having a plurality of openings therethrough, a plurality of blow molds seated on the table coincident with said openings, and mechanism beneath the table for raising the blow molds one by one into operative engagement with the neck mold.

18. The combination of a neck mold, blank-forming mechanism adapted to secure the neck end of a tubular blank in the neck mold with the blank suspended therefrom, a horizontally movable table having vertical openings therein extending through the edge of the table, blow molds removably seated on the table in said openings, a cylinder and piston located at one side of the table, and a mold lifting arm projecting from the piston and operative through the table openings for lifting the blow molds one by one into operative relation with the neck mold.

19. The combination of an upright support, a carrier revolubly mounted on the support with its axis disposed horizontally, parison and blow molds on the carrier with the parison mold above the neck mold when forming a blank and with the carrier turned and the parison mold beneath the neck mold after the blank has been formed, the parison mold adapted to be open when beneath the neck mold, a horizontally movable table at one side of the upright support, a vertical slide-way, a mold lifting device movable in the slide-way for raising the blow molds one by one into operative relation with the neck mold, and means for operating said lifting device.

In testimony whereof I affix my signature in presence of two witnesses.

FRANK O'NEILL.

Witnesses:
 NINA L. SOUDERS,
 J. M. BAILEY.